United States Patent [19]
Bauer

[11] Patent Number: 5,176,417
[45] Date of Patent: Jan. 5, 1993

[54] TILT CAB LATCH

[75] Inventor: David R. Bauer, Brookfield, Wis.

[73] Assignee: Applied Power Inc., Butler, Wis.

[21] Appl. No.: 778,420

[22] Filed: Oct. 16, 1991

[51] Int. Cl.⁵ .............................................. E05C 3/26
[52] U.S. Cl. ................................ 292/201; 180/89.14;
296/35.1; 292/DIG. 40
[58] Field of Search ................... 292/201, 216, 341.16,
292/279, DIG. 14, DIG. 40, DIG. 43;
180/89.14, 89.15, 89.18; 296/35.1

[56] References Cited

U.S. PATENT DOCUMENTS

| | | | |
|---|---|---|---|
| 3,596,960 | 8/1971 | Mayer | 292/216 |
| 3,767,243 | 10/1973 | Yoshimura | 292/216 |
| 4,114,718 | 9/1978 | Lipshield | 180/89.14 |
| 4,225,004 | 9/1980 | Lipshield | 180/89.14 |
| 4,624,491 | 11/1986 | Vincent | 292/201 |
| 4,735,447 | 4/1988 | Kleefeldt | 292/216 |
| 4,869,536 | 9/1989 | Kleefeldt | 292/210 |
| 4,896,907 | 1/1990 | Hayakawa et al. | 292/216 |
| 5,025,880 | 6/1991 | Kato | 180/89.14 |

Primary Examiner—Richard E. Moore
Attorney, Agent, or Firm—Quarles & Brady

[57] ABSTRACT

A tilt cab latch has a piston which is biased to cam on a rotor to capture and exert a preload force on a pin. The end of the piston is formed by cylindrical and conical surfaces which match respective internal cylindrical and angled cylindrical surfaces on the rotor. The conical and angled cylindrical surfaces cam on one another to exert the preload force on the pin, and the cylindrical surfaces provide positive locking against retrograde rotation of the rotor.

19 Claims, 4 Drawing Sheets

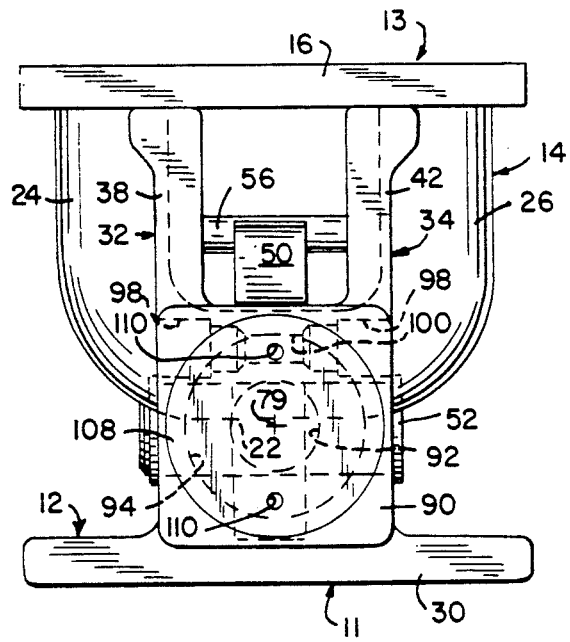
FIG. 3
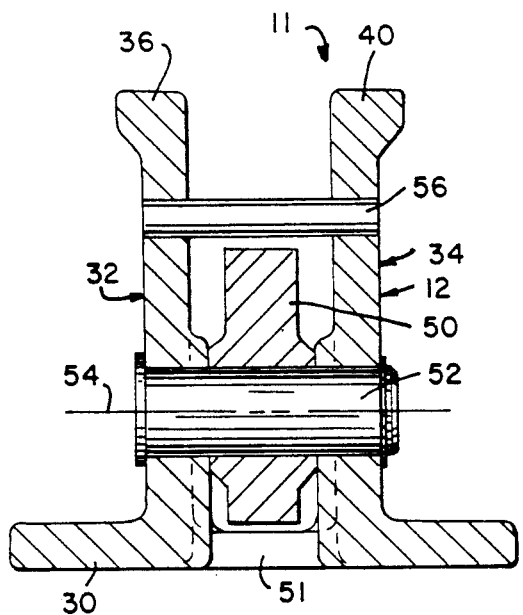
FIG. 4
FIG. 8
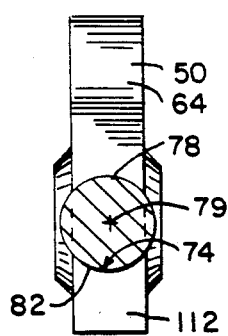
FIG. 5
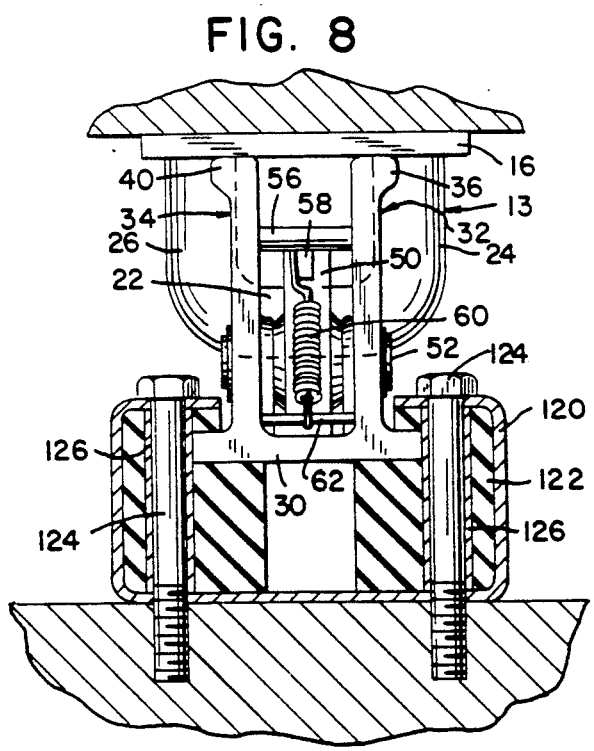

TILT CAB LATCH

FIELD OF THE INVENTION

This invention relates to latches of the type that are used for securing the cab of a tilt cab vehicle to the chassis of the vehicle.

BACKGROUND OF THE INVENTION

In certain types of vehicles, the passenger compartment or cab as it is commonly known is positioned over the engine of the vehicle and is pivotable, usually about a horizontal axis located at the front of the cab, to gain access to the engine for maintenance. If the pivot axis is at the front, then a releasable connection is usually provided near the rear of the cab to secure the cab and the chassis together so that the cab is prevented from tilting forward during operation of the vehicle. A common vehicle of this type is the well known "cab-over" truck.

Latches for securing the cab to the chassis in these types of vehicles must be extremely reliable, capable of securing large forces without substantial play, and inexpensive to manufacture. For reliability and manufacturing, it is desirable to keep the latch as simple as possible. However, since the latch must be capable of securing large loads without substantial play, it is desirable for the latch to exert a substantial preload force on the connection between the cab and chassis and be capable of holding the connection without substantial play even while subjected to significant forces.

Latches are known in the prior art for securing a tilt cab to a chassis with a preload force. For example, U.S. Pat. No. 4,114,718 of Eugene C. Lipshield discloses one such device. In this device, a pin is hooked and a vertical preload applied to the pin by the hook by virtue of the pin being slideable in a generally vertical direction about its pivot point. The pin is cammed downwardly to exert a vertical preload on the pin by a cam member which is biased to hold the hook in the latched position and is released by hydraulic pressure.

The required relatively complex combination of vertical and angular motion of the hook employed by these types of devices required relatively complex and relatively more parts than necessary for making an effective hydraulic tilt cab latch. Also, as indicated in later U.S. Pat. No. 4,225,004 of Eugene C. Lipshield, these devices suffered from other infirmities in the event that the components of the latch became jammed or improperly seated. Because of the relatively great height required by the prior latching mechanisms, it was difficult in these designs to provide for proper guiding and seating of the latching pin to be properly engaged by the hook.

SUMMARY OF THE INVENTION

The invention provides an improved tilt cab latch which is compact, reliable, provides excellent guiding and seating of the pin even with substantial misalignments, is capable of securing a very high load, exerts a preload on the pin to substantially eliminate play, and is inexpensive to manufacture.

A tilt cab latch of the invention has a rotor mounted to pivot in a housing for capturing a latch pin in the housing. The rotor has a hook surface for capturing the pin in a latched position and a pin camming surface opposite from the hook surface for engaging the pin in a cocked position and camming on the pin to move the rotor toward the latched position. A locking piston is mounted on the housing to be reciprocable along a piston axis, and an engagement surface is formed on the rotor for engaging the locking piston in the latched position. The engagement surface has a preloading surface for camming on the piston as the piston engages the preloading surface to rotate the rotor about the rotor axis in the angular direction from the cocked position to the latched position of the rotor. The piston is biased into engagement with the engagement surface and means are provided to retract it for disengaging it from the engagement surface. When the piston cams on the preloading surface, the rotor is rotated in the angular direction from the cocked to the latched position to exert a preload force on the pin.

Because a latch of the invention can be made compact, and of a relatively low vertical height, a guideway can advantageously be formed on the housing so that the guideway opens outwardly for guiding and receiving the latch pin. The hook surface preferably engages the latch pin in the guideway. The guideway serves to locate the latch pin for engagement by the rotor.

In an especially useful form, a piston chamber is formed in the housing and the locking piston is received in the chamber. Pressurized fluid can be admitted to the chamber for retracting the piston from the engagement surface to provide a convenient, self-contained means for releasing the latch.

In another aspect, a piston cam surface is formed on the rotor on which the piston cams as the rotor moves in the angular direction from the cocked position to the latched position. In a preferred form, the piston has an external conical surface and the preloading surface is formed by an internal angled cylindrical surface which cams on the external conical surface of the piston to exert a preload force on the pin. Matching cylindrical surfaces can also be provided on the piston and engagement surface which engage one another before the conical and angled cylindrical surfaces engage when the piston engages the engagement surface. The cylindrical surfaces serve to arrest any retrograde rotation of the rotor should the piston be cammed to an intermediate retracted position in which the cylindrical surfaces seat on one another.

In a preferred form, the distance from the preloading surface to the rotor axis is greater than the distance from the latch pin to the rotor axis as measured along a radial line which is tangent to the latch pin. Thereby the force exerted by the piston on the rotor is amplified at the point where it acts on the pin. In addition, the rotor axis is preferably positioned relative to the pin to preload the pin vertically and horizontally to eliminate play in both directions.

Many other features and advantages of the invention will be apparent from the drawings and detailed description.

BRIEF DESCRIPTION OF THE DRAWINGS

FIG. 3 is a side plan view of the latch of FIG. 1 as viewed from the left side in FIG. 1;

FIG. 4 is a cross-sectional view of the catch of the latch of FIG. 1 as viewed from the line 4—4 of FIG. 1 and not showing the rotor return spring;

FIG. 5 is a cross-sectional view of a portion of the catch of the latch of FIG. 1 as viewed from the line 5—5 of FIG. 1;

FIG. 8 is a view of a second embodiment of a latch of the invention with portions broken away;

DETAILED DESCRIPTION OF THE PREFERRED EMBODIMENTS

Figure 2:
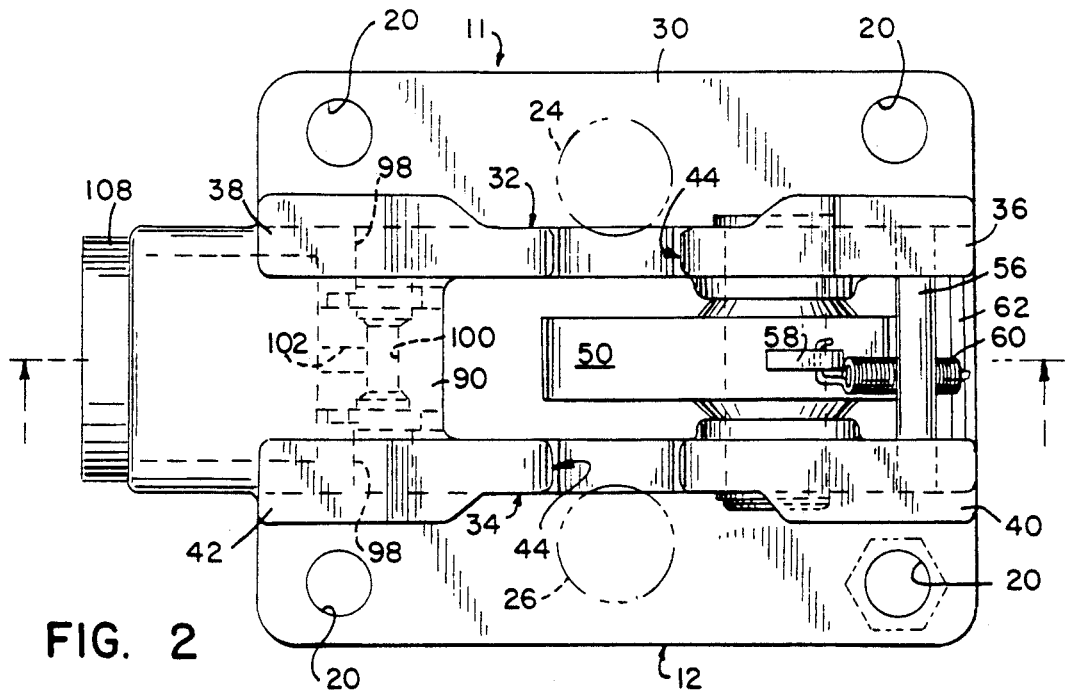
FIG. 2 is a top plan view of a catch for the latch of FIG. 1 shown in the latched position and with arms of a pin for the latch shown in phantom.

Referring to FIGS. 1-4, a tilt cab latch 10 of the invention is illustrated. The latch 10 includes a catch 11 having a housing 12 and a grip 13 having a latch pin 14 which, in the preferred embodiment shown, is fixed such as by welding or other appropriate means to a mounting plate 16 of the grip 13. The mounting plate 16 has four holes 18 and the housing 12 has four holes 20 for permanently securing the respective plate 16 and housing 12 to the cab and to the chassis of a tilt cab vehicle, such as a "cabover" type truck with fasteners such as bolts. Typically, a suspension unit such as that described in commonly owned co-pending U.S. patent application Ser. No. 07/778,421 filed on the same day as this application and entitled "Truck Cab Suspension Unit" is also interposed in the connection between the cab and the chassis. Thus, the truck cab suspension unit can be permanently affixed, such as by bolting, to either the cab or to the chassis and either the mounting plate 16 or the housing 12 can be affixed to the suspension unit, with the other part (either the housing 12 or the mounting plate 16, whichever part is not permanently affixed to the suspension unit) secured to either the cab or chassis, whichever of the cab and chassis is not permanently affixed to the suspension unit.

The latch pin 14 is U-shaped having a base portion 22 and two legs portions 24 and 26. The central axis of the base portion 22 defines the pin axis 28 which in a typical installation is horizontal and extends fore and aft relative to the fore and aft directions of the truck.

The holes 20 in the housing 12 are positioned generally in the corners of a mounting base 30 of the housing 12. Spaced apart flanges 32 and 34 extend upwardly from the mounting base 30, and each flange 32 and 34 defines two opposed wings 36 and 38 on the flange 32 and two opposed wings 40 and 42 on the flange 34. Each pair of wings 36, 38 and 40, 42 define between them a guideway 44 having an upwardly opening U-shaped throat portion 46 and an outwardly flared mouth portion 48. The guideway 44 defined by the wings 36 and 38 is laterally aligned with the guideway 44 defined by the wings 40 and 42. The opening at the top of the mouth portion 48 in the preferred embodiment is approximately 2.72 inches, so that even with substantial lateral misalignments the pin 14 can be aligned into engagement by the rotor 50.

A rotor 50 is positioned in the space between the flanges 32 and 34 and the housing 12 has a central opening 51 to provide clearance for the rotor. The rotor 50 is journaled on pin 52 to pivot about rotor axis 54 which is defined by the central axis of the pin 52. As shown, the rotor axis 54 is generally parallel to the pin axis 28, so that both axes in a typical application would extend generally horizontally fore and aft. The pin 52 extends between wings 36 and 40 and is secured in position by snap clips or any other suitable means.

A stop 56 made up of a pin spanning and press fitted into the wings 36 and 40 abuts the rotor 50 when the rotor 50 is in a cocked position. The rotor 50 has a spring connection point 58 to which extension spring 60 is connected. The opposite end of extension spring 60 is hooked on pin 62 which spans and is press fitted into wings 36 and 40. Spring 60 biases rotor 50 against the stop 56 into the cocked position.

Figure 1:
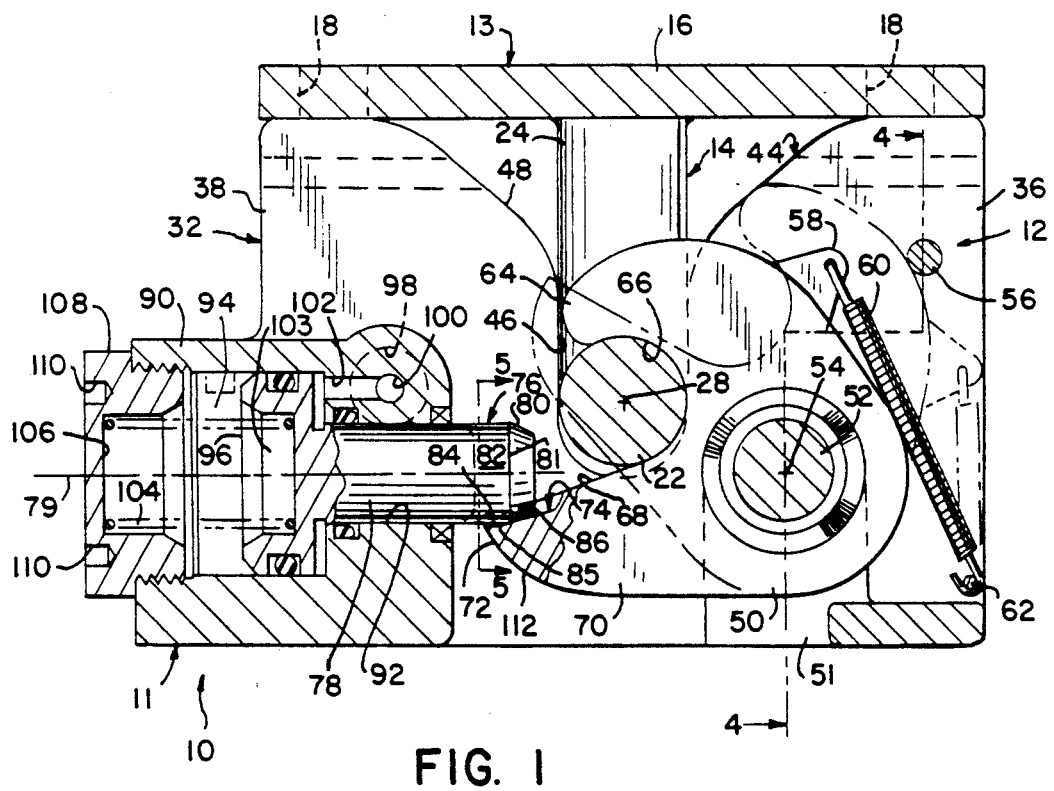
FIG. 1 is a cross-sectional view of a tilt cab latch of the invention as viewed from the line 1—1 of FIG. 2.

To the left of the rotor axis 54 as viewed in FIG. 1, the rotor 50 defines a nose 64 which on its inner side defines a hook surface 66. The hook surface 66 is preferably of a generally cylindric shape having a radius slightly larger than the radius of the base 22 of the pin 14. For example, in the preferred embodiment the base 22 is nominally ¾ inches in diameter and the diameter defining the hook surface 66 is nominally 0.765 inches. The hook surface 66 extends from the end of the nose 64 for approximately 180° to where it is coterminous with a pin camming surface 68 defined on the inner side of a locking leg 70 of the rotor 50. The pin camming surface 68 extends to the end 72 of the locking leg 70 where a piston engagement surface 74 is defined.

The piston engagement surface 74 is engaged by the end 76 of a piston 78 when the rotor 50 is in the latched position. The piston 78 is reciprocable along a generally horizontal piston axis 79 which, in the preferred embodiment, is generally aligned to intersect the rotor axis 54. The end 76 of the piston 78 is chamfered so as to produce an exterior conical surface 80 on the piston end 76. Thus, the end 76 of the piston 78 which is engaged by the piston engagement surface 74 is defined by an exterior cylindrical surface 82 of the diameter of the piston 78 at its end 76 and by the exterior conical surface 80.

The piston engagement surface 74 is shaped to match the exterior surfaces on the piston end 76. Therefore, the engagement surface 74 has an interior cylindrical surface 84 of approximately the same diameter as the exterior cylindrical surface 82 and an interior angled cylindrical surface 86 which matches the angle of the exterior conical surface 80 and matches the diameter of the interior cylindrical surface 84. At line of intersection 85, the surfaces 84 and 86 are coterminus, as are the surfaces 80 and 82 at line of intersection 81.

A piston block 90 is formed between wings 38 and 42 and extending leftwardly of wings 38 and 42 as shown in FIGS. 1 and 2. The piston block 90 defines a sealed piston guide bore 92 and a piston chamber at the leftward end of the bore 92. The piston 78 has a head 96 of an enlarged diameter received in the piston chamber 94 in sealed and sliding engagement. The piston chamber 94 can be pressurized on the right side of head 96 (as viewed in FIG. 1) with hydraulic fluid via port 98 and passageways 100 and 102 to disengage end 76 of piston 78 from the piston engagement surface 74. A port 98 is provided on each side of the housing 12, and whichever port 98 is not used is plugged.

At its leftward side as shown in FIG. 1, head 96 is recessed at 103 to receive the end of compression spring 104, the other end of which is received in recess 106 of plug 108 which is threaded into and seals off the leftward end of piston chamber 94. Blind bores 110 can be provided in the face of plug 108 to receive an appropriate tool for installing and removing the plug 108. The compression spring 104 serves to bias the piston 78 into engagement with the engagement surface 74.

Figure 7:
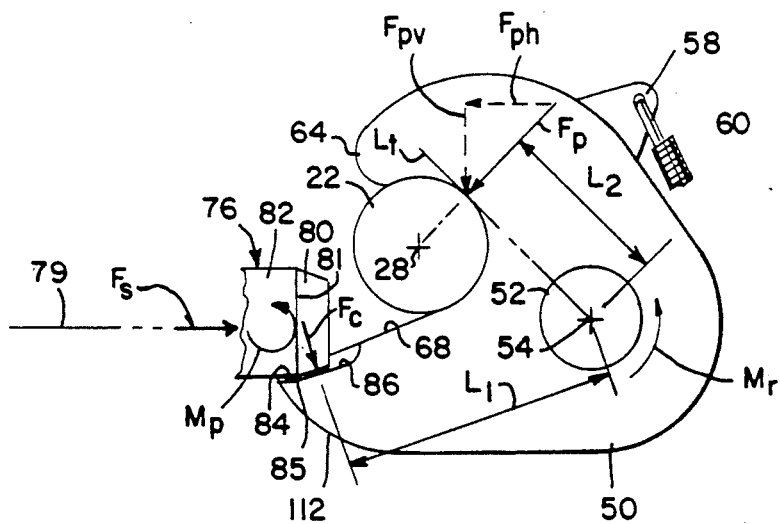
FIG. 7 is a schematic force vector diagram illustrating forces on the latch for exerting a preload on the pin.

The outer side of the locking leg 70 gradually recedes from the end 72 of the locking leg 70 to define a piston camming surface 112 on the rotor 50. Referring to FIG. 7, as the pin 14 approaches the housing 12, the mouth 48 of the guideway 44 serves to align the pin 14 into the throat 46 of the guideway 44. Approximately simultaneous with being aligned into the throat 46, the base 22 of the pin 14 begins to bear on the pin camming surface 68 of the rotor 50.

Figure 6:
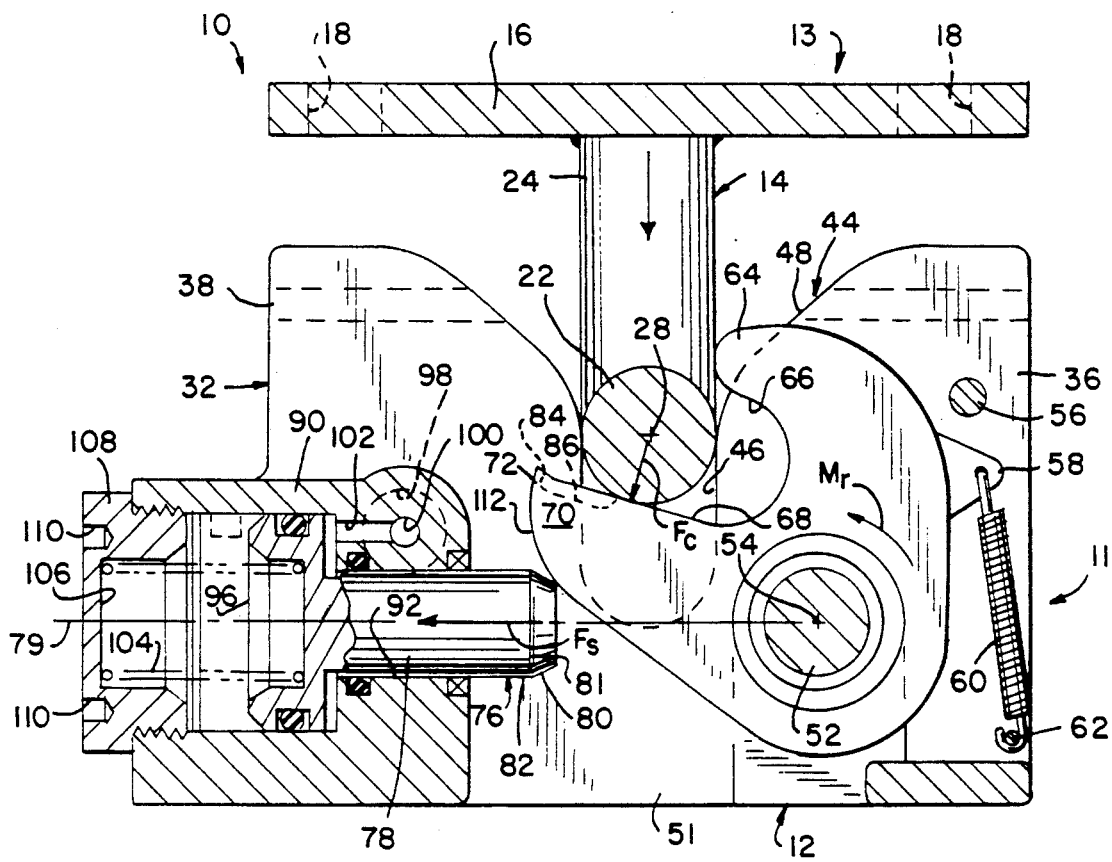
FIG. 6 is a view similar to FIG. 1 but showing the catch being enlarged by the pin of latch.

As the base 22 bears on the pin camming surface 68, the rotor 50 begins to rotate counterclockwise in the direction of arrow $M_r$ shown in FIG. 6 due to the force $F_c$ exerted on the pin camming surface 68 by the base 22 of pin 14. When the rotor 50 begins rotating, if the piston 78 is not retracted because of pressurized hydraulic fluid in the piston chamber 94 overcoming the spring 104, the end 76 cams on the piston camming surface 112 of rotor 50 and is thereby urged in the direction indicated by the arrow $F_s$ (FIG. 6) against the bias of compression spring 104.

As the pin 14 continues to move downwardly into the throat 46, the rotor 50 continues to rotate as the base 22 cams on the pin camming surface 68. When the end 76 of the piston 78 clears the end 72 of the locking leg 70 at the end of the engagement surface 74, spring 104 drives the end 72 of the leg 70 into engagement with the engagement surface 74. This is indicated in FIG. 7 by the piston 78 moving in the rightward direction toward the rotor as shown by the arrow $F_s$.

When the exterior conical surface 80 on the piston end 76 begins to cam on the interior angled cylindrical surface 86 of the piston engagement surface 74, a force $F_c$ is produced on the end 72 of the locking leg which tends to rotate the rotor 50 counterclockwise as viewed in FIG. 7 and indicated by the arrow $M_r$ in FIG. 7. Approximately simultaneous with engagement of the piston 78 in the piston engagement surface 74 or only slightly thereafter, mounting plate 16 comes into contact with the top surface of the housing 12.

As the piston exterior conical surface 80 cams on the engagement surface angled cylindrical surface 86, a force $F_p$ indicated in FIG. 7 is exerted on the base portion 22 of pin 14, drawing the plate 16 down against the top of the housing 12. The force $F_p$ has a substantial vertical component $F_{pv}$ which introduces a vertical preload in the pin 14 to place the legs 24 and 26 of the pin 14 substantially in tension. The force $F_p$ thereby pulls the mounting plate 16 down against the top of the housing 12 with a vertical preload force $F_{pv}$ to produce a tight connection between the catch 11 and the grip 13.

The cone angle of the surface 80 and the matching angle of the surface 86 are shallow so that a force tending to rotate the rotor 50 clockwise would be resisted by the piston 78, rather than the piston 78 merely being cammed out of engagement with the surface 86. In this regard, the component of force $F_c$ in the direction (horizontal) along the piston axis 79 is small in relation to the orthogonal (vertical) component. The vertical component produces a force couple $M_p$ on the piston 78 which tends to increase the frictional forces on the piston that resist its movement along the piston axis 79.

On the other hand, only a relatively low spring force exerted by the spring 104 is required to produce a relatively high preload force $F_p$ on the pin 14. For example, in the preferred embodiment, a spring force of approximately 55 pounds has been found adequate. It is noted that the angle of the conical surface 80 and of the angled cylindrical surface 86 is preferably about 20° measured relative to the corresponding cylindrical surfaces 82 or 84.

Since the angle of the surfaces 80 and 86 is shallow measured with respect to the piston axis, the piston 78 is largely subjected to shear loading to counteract forces transmitted from the rotor 50 to the piston 76 and retard retrograde movement of the piston 78 against the bias of spring 104 when a force is applied to the pin 14 tending to rotate the rotor 50 clockwise. If however, by some circumstance the piston 78 be cammed leftwardly as viewed in FIG. 7 by the surfaces 80 and 86, such camming action would be curtailed when the cylindrical surfaces 82 and 84 came into contact. At that time, the entire force transmitted from the rotor 50 to the piston 78 would be in the direction orthogonal to the piston axis 79, since the cylindrical surfaces 82 and 84 are parallel to the piston axis 79. Thereby the entire shear and bending strength of the piston 78 would be employed to resist further retrograde rotation of the rotor 50.

It is also noted that the surface 86 is further from the rotor axis 54 than the base 22 of pin 14 as measured along a line which is tangent to the base 22. This increases the moment arm through which the force $F_c$ acts about the rotor axis 54 to further amplify the force $F_c$ where it acts on the base 22 as indicated by the force vector $F_p$. Thus, the moment arm $L_1$ is greater than the moment arm $L_2$, which has the effect of amplifying the force $F_c$ at the base 22.

It is desirable to position the surfaces 80 and 86 relative to the rotor axis 54 so that substantially the entire force $F_c$ acts through the moment arm $L_1$. This is accomplished by forming and positioning the surface 86 so that a line defined by the surface 86 at its central plane (i.e., the plane of the line 1—1 of FIG. 2) intersects or comes near to intersecting the rotor axis 54, i.e., the force $F_c$ is perpendicular or nearly perpendicular to a line which is radial to the rotor axis 54.

In addition, the rotor axis 54 is positioned relative to the pin 14 when the pin is in the latched position so that the force $F_p$ has a substantial vertical component $F_{pv}$ and a substantial horizontal component $F_{ph}$. This preloads the pin both vertically and horizontally to eliminate play in both directions. It is accomplished in the preferred embodiment by positioning the rotor axis 54 relative to the pin 14 so that so that line $L_t$ which is radial to the rotor axis 54 is at approximately a 45° angle to horizontal.

An alternate embodiment is shown in FIG. 8 in which the mounting base 30 of the housing 12 is received within a casing 120 which envelopes an elastomeric body 122. Bolts 124 extend through the casing 120 and elastomeric body 122 to secure the casing 120 to a vehicle chassis, cab, or suspension unit. Sleeve-like spacers 126 are provided around the bolts 124 to keep the bolts 124 from crushing the casing 120 and elastomeric body 122. The elastomeric body 122 provides a shock and vibration isolation mount for the latch 10. It should be understood that such a shock and vibration isolation mount could, alternatively or as an addition, be provided to mount the mounting plate 16 of the grip 13. A suitable material for the elastomeric body 122 is commercially available under the tradename "Sorbothane" from Sorbothane, Inc. of Kent, Ohio.

Figure 9:
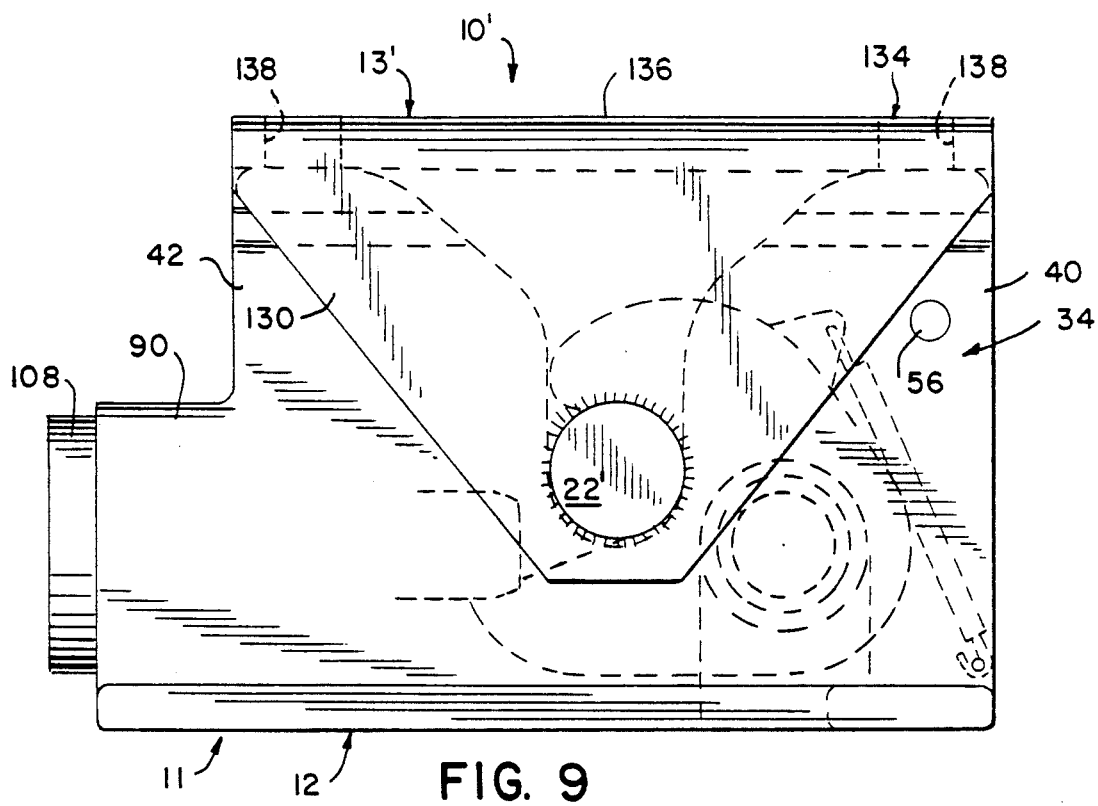
FIG. 9 is a front elevation view of a third embodiment of a latch of the invention.
Figure 10:
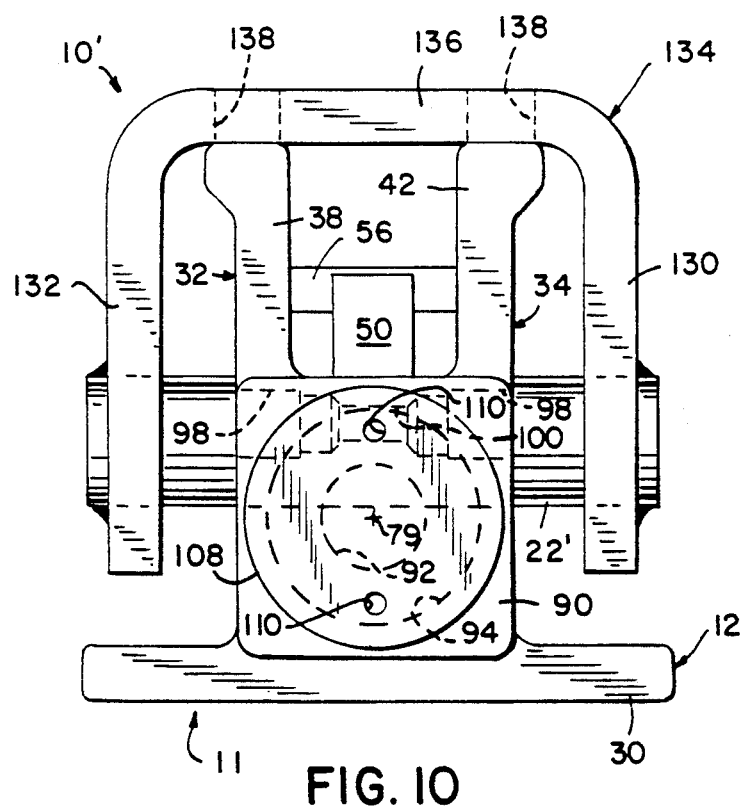
FIG. 10 is a side elevation view of the latch of FIG. 9.

A second alternate embodiment 10' is shown in FIGS. 9 and 10. The latch 10' is identical in all respects to the latch 10, except for the grip 13'. In the latch 10', the grip 13' has a base pin 22' which is welded or otherwise suitably secured at its ends to arms 130 and 132 of a yoke 134 of the grip 13'. The yoke 134 has a foundation 136 having bolt holes 138 for attachment in the manner of attachment of mounting plate 16 of the latch 10. This embodiment may be desirable where it is desired to envelope the housing 10 with the grip 13' so as to provide stops in the fore and aft direction. However, the grip 13 may be preferred where space limitations or interference with hydraulic hoses or other equipment is a consideration.

Preferred embodiments of the invention have been described. Numerous modifications and variations of those embodiments will be apparent to those of skill in the art but which are still within the spirit and scope of the invention. For example, while hydraulic release of the latch is preferred, pneumatic or manual release could be provided in a latch of the invention, or the piston could engage the rotor at any point along its periphery. Therefore, the invention should not be limited by the scope of the foregoing, but only by the claims that follow.

We claim:

1. A tilt cab latch for securing a cab to a chassis of a tilt cab vehicle, comprising:
    a housing;
    a latch pin having a pin axis;
    a rotor having a hook surface for capturing said pin in a latched position of said rotor, a pin camming surface opposite from said hook surface for engaging said pin in a cocked position and camming on said pin to move said rotor toward the latched position;
    means for mounting said rotor to said housing to pivot relative to said housing about a rotor axis which is generally parallel to and spaced apart from the pin axis in the latched position;
    a locking piston mounted on said housing to be reciprocable along a piston axis;
    an engagement surface formed on said rotor for engaging said locking piston in the latched position, said engagement surface including a preloading surface for camming on said piston as said piston engages said preloading surface to rotate said rotor about the rotor axis in the angular direction from the cocked position to the latched position of the rotor;
    means for biasing said locking piston into engagement with said engagement surface;
    means for retracting said locking piston for disengaging said locking piston from said engagement surface; and
    means for mounting the pin and housing between a cab and a chassis of a vehicle to secure the cab and chassis;
    wherein rotating the rotor in the angular direction from the cocked position to the latched position by camming the piston on the preloading surface exerts a preload force on said pin.

2. A tilt cab latch as in claim 1, further comprising a guideway on said housing opening outwardly for guiding and receiving said latch pin, said hook surface engaging said latch pin in said guideway.

3. A tilt cab latch as in claim 1, wherein said piston axis extends in a direction which is generally radial to said rotor axis.

4. A tilt cab latch as in claim 1, wherein a piston chamber is formed in said housing, the locking piston is received in said chamber, and further comprising means for admitting pressurized fluid to said chamber to retract said piston from said engagement surface.

5. A tilt cab latch as in claim 2, wherein the housing has two flanges which are spaced apart along the rotor axis, each flange has two wings which define the guideway between them, and the rotor is received between the flanges.

6. A tilt cab latch as in claim 5, wherein a pin spans the flanges to abut and position the rotor in the cocked position.

7. A tilt cab latch as in claim 1, wherein the rotor has a locking leg opposite from the hook surface, the pin camming surface being formed on said locking leg and said engagement surface being defined on said locking leg.

8. A tilt cab latch as in claim 1, further comprising means for biasing said rotor in the cocked position.

9. A tilt cab latch as in claim 1, wherein said mounting means includes elastomeric vibration isolation means.

10. A tilt cab latch as in claim 1, further comprising a piston cam surface formed on said rotor on which said piston cams as said rotor moves in the angular direction from the cocked position to the latched position.

11. A tilt cab latch as in claim 1, wherein said latch pin has a flange which abuts the housing and is drawn against the housing with a preload force when said piston cams on the preloading surface.

12. A tilt cab latch as in claim 1, wherein said latch pin is U-shaped having a base and legs extending in the same direction from said base, the hook surface of said rotor engaging the base of said latch pin.

13. A tilt cab latch as in claim 1, wherein said piston has an external conical surface and said preloading surface is formed by an internal angled cylindrical surface which cams on said external conical surface of said piston to exert a preload force on the pin.

14. A tilt cab latch as in claim 13, wherein said piston has an external cylindrical surface and said engagement surface is formed by an internal cylindrical surface which matches said external cylindrical surface of said piston, said cylindrical surfaces engaging one another before said external conical surface and said internal angled cylindrical surface engage when said piston engages said engagement surface.

15. A tilt cab latch as in claim 14, wherein the axis of the piston lies along a line which is radial to the rotor axis.

16. A tilt cab latch as in claim 1, wherein the distance from the preloading surface to the rotor axis is greater than the distance from the latch pin to the rotor axis as measured along a radial line which is tangent to the pin.

17. A tilt cab latch as in claim 1, wherein said latch pin spans the arms of a yoke.

18. A tilt cab latch as in claim 1, wherein the rotor axis is positioned relative to the pin to preload the pin vertically and horizontally.

19. A tilt cab latch as in claim 18, wherein a line which is radial to the rotor axis and tangent to the pin is at approximately 45° to horizontal.

* * * * *